J. DEMMLER.
TRANSMISSION.
APPLICATION FILED FEB. 19, 1917.
1,249,347.
Patented Dec. 11, 1917.
3 SHEETS—SHEET 1.
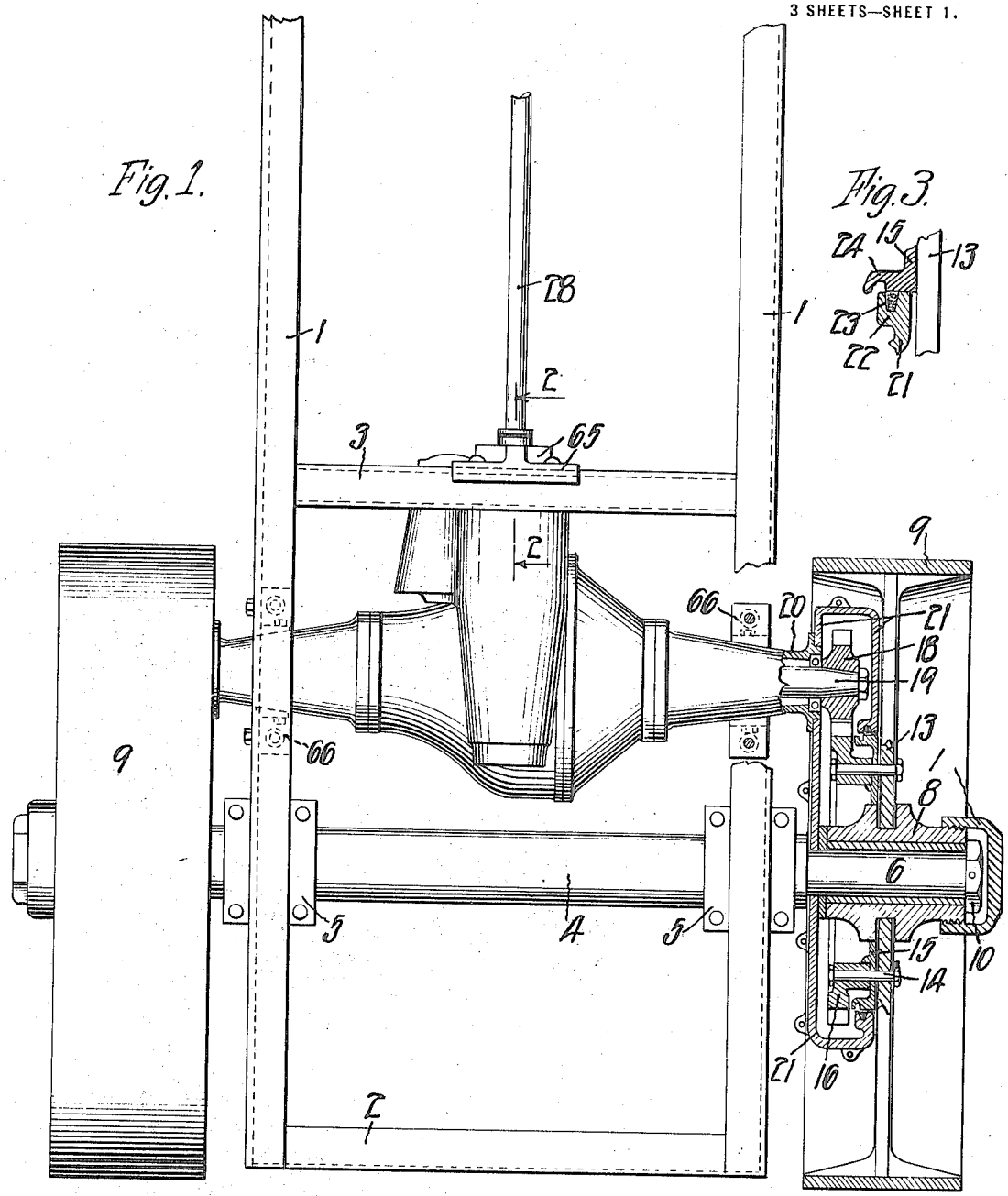
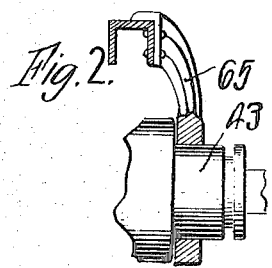
Inventor,
John Demmler,
By
Bakewell & Spencer
Attys.

J. DEMMLER.
TRANSMISSION.
APPLICATION FILED FEB. 19, 1917.
1,249,347.
Patented Dec. 11, 1917.
3 SHEETS—SHEET 2.
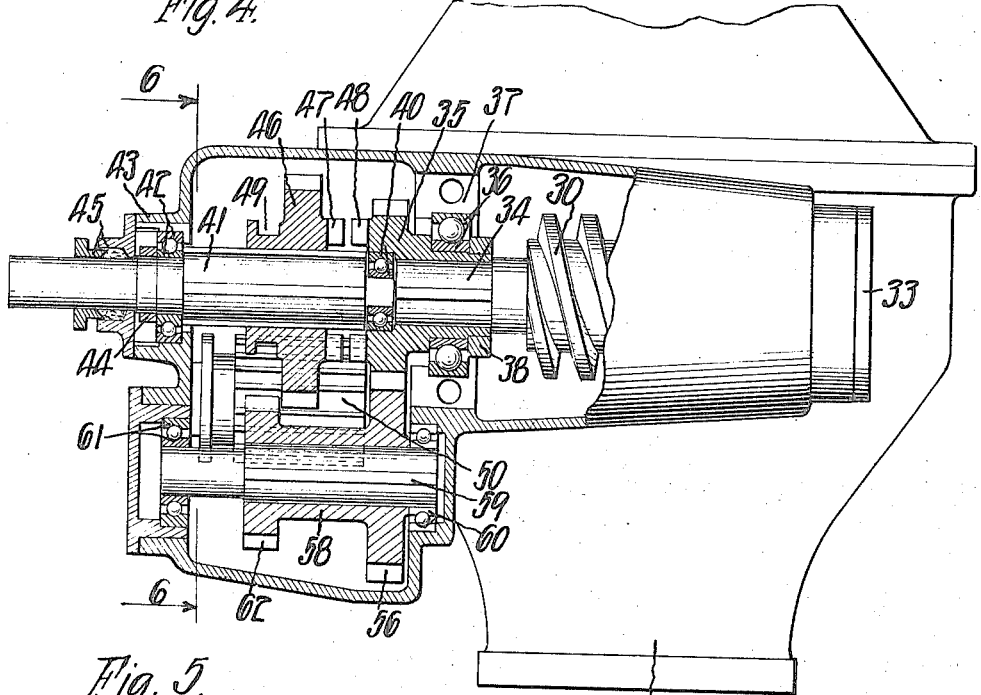
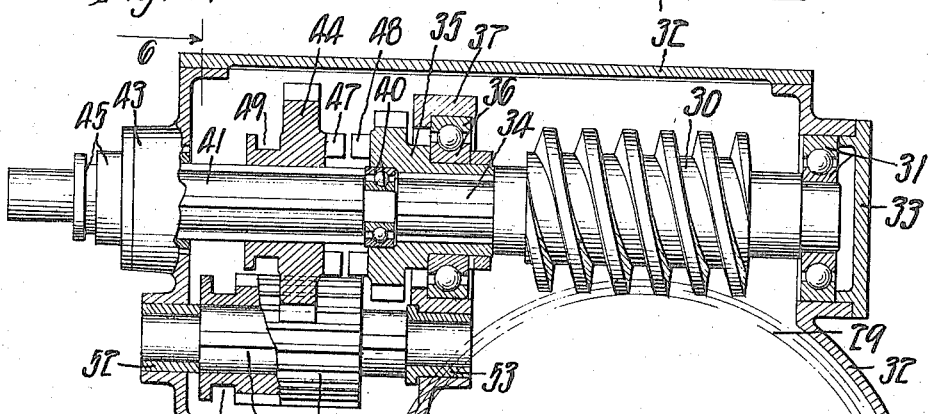
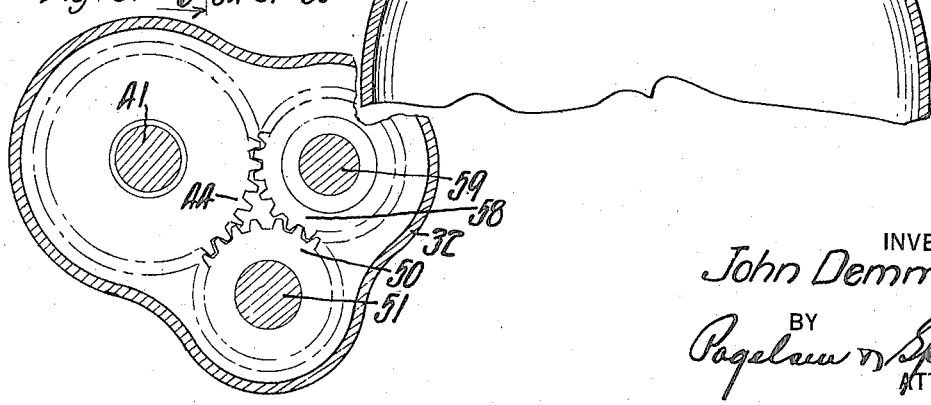
INVENTOR
John Demmler,
BY
ATTORNEYS

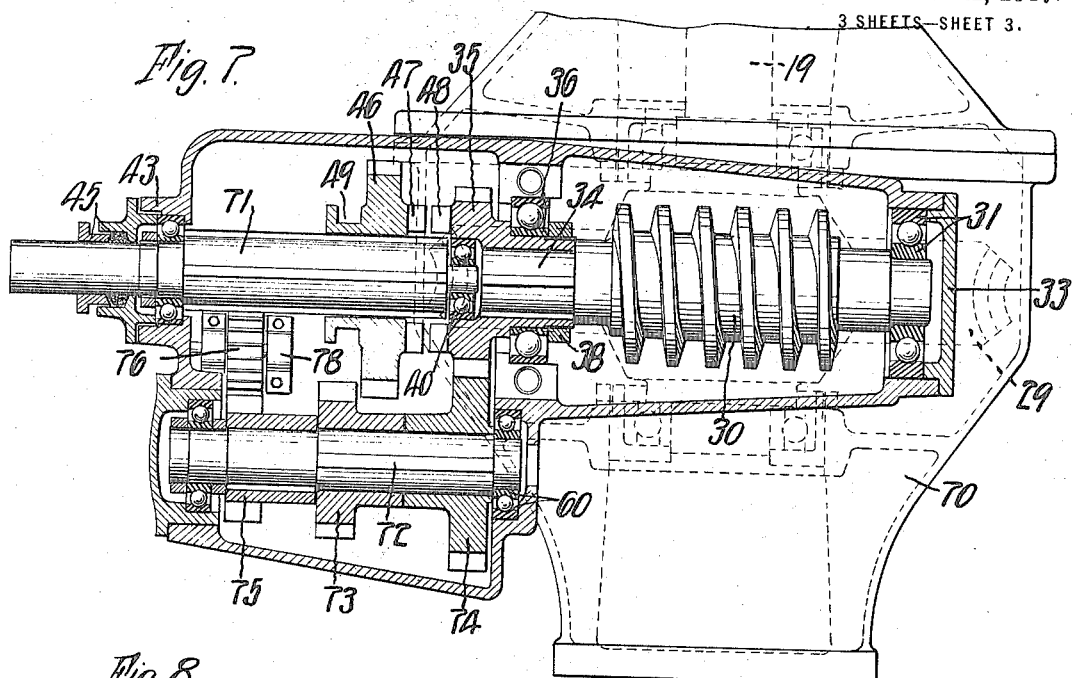
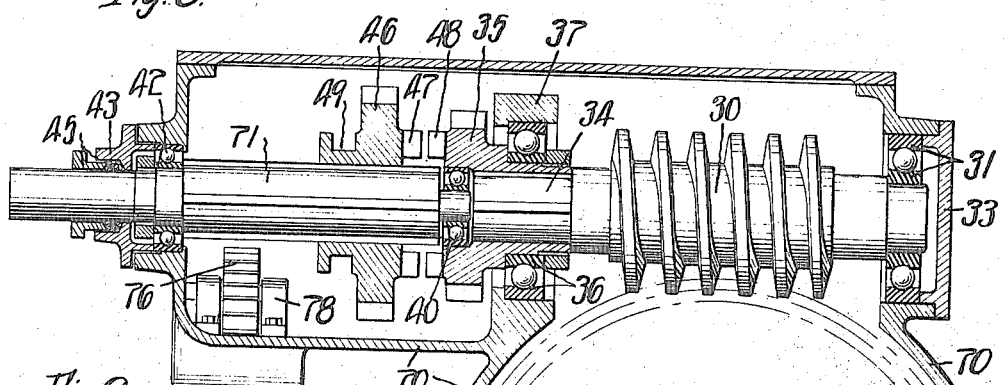
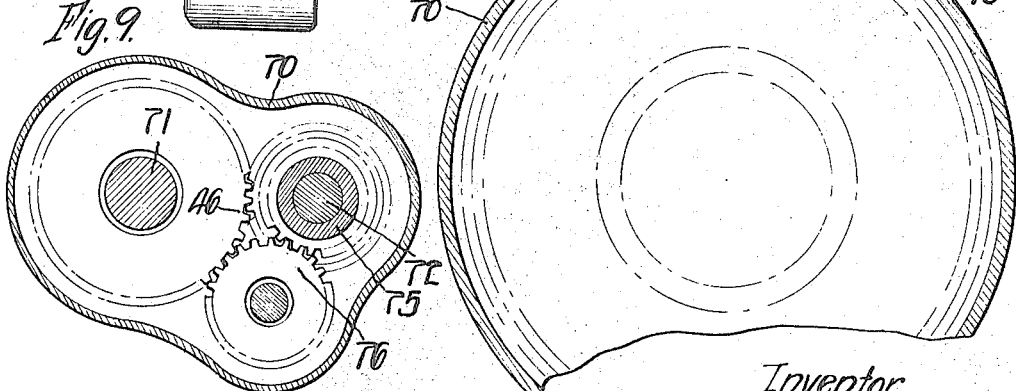

UNITED STATES PATENT OFFICE.

JOHN DEMMLER, OF DETROIT, MICHIGAN.

TRANSMISSION.

1,249,347.　　　　Specification of Letters Patent.　　Patented Dec. 11, 1917.

Application filed February 19, 1917. Serial No. 149,402.

*To all whom it may concern:*

Be it known that I, JOHN DEMMLER, a subject of the Emperor of Germany, and residing at Detroit, in the county of Wayne and State of Michigan, have invented a new and Improved Transmission, of which the following is a specification.

The present invention relates to gearing for driving tractors or other vehicles which are required to develop a high degree of pulling power, and it consists in a vehicle having wheels and a worm driven jack-shaft and reduction gearing through which said wheels are driven, together with a transmission or speed changing mechanism whereby said worm may be driven directly from the engine on low speed, and whereby it may be driven indirectly therefrom on high speed; also in speed changing mechanism for the purpose mentioned wherein the worm may be driven directly on low speed and indirectly on high speed and on reverse, and wherein the shift from low speed to reverse may be made without passing through high speed. It further consists in a vehicle having wheels and a worm driven jack-shaft whereby the wheels are driven, together with a shaft in alinement with the axis of the worm, and clutch gears, one of which is slidable on the shaft section whereby the latter may drive the worm directly. Again, it consists in a slidable idler or reversing gear constantly in mesh with the slidable gear on the shaft section that is alined with the worm, said idler being arranged when in one position to also mesh with another gear that is itself in mesh with the gear on the worm, whereby the vehicle may be driven backwardly. It further consists in a worm driven jack-shaft, and speed changing mechanism for driving the worm, one of the supports of said mechanism being the casing of the jack-shaft, in combination with additional gearing for driving the wheels from the jack-shaft at a reduced speed, whereby a compact installation is formed. Another feature of the invention resides in the casing whereby the last mentioned gearing is inclosed and whereby the escape of lubricant is prevented. The invention also consists in the various other details of construction shown, described and claimed.

In the drawings, Figure 1 is a fragmentary plan view of a tractor chassis, parts being broken away, showing a preferred embodiment of the invention. Fig. 2 is a section on the line 2—2 of Fig. 1. Fig. 3 is an enlarged section showing the details of the joint between the fixed and moving parts of the gear casings for the wheels. Fig. 4 is a fragmentary plan view corresponding to Fig. 1, parts being broken away. Fig. 5 is a fragmentary side elevation corresponding to Fig. 4, parts being broken away. Fig. 6 is a section on the line 6—6 of Figs. 4 and 5. Figs. 7, 8 and 9 are views similar, respectively, to Figs. 4, 5 and 6, showing a modification.

The chassis frame shown includes the side bars 1, the rear cross bar 2 and an intermediate cross bar 3, and between the cross bars the frame rests on the non-rotatable axle 4 of any suitable cross section, which is secured to the frame by suitable boxes or the equivalent 5. The ends 6 of the axle are reduced and pass through the hubs 8 of the driving wheels 9 which may be retained thereon by the nuts 10, the latter being concealed by the dust-excluding and lubricant-retaining hub caps 11. Secured to the spoke or web construction 13 of the wheel on its inner side by means of the bolts 14 are the annular casing element 15 and the annular spur gear 16. The latter is driven by a pinion 18 on the jack-shaft 19, and supported upon the protruding end 20 of the casing by which the jack-shaft is inclosed, and the inner portion of the end of the axle is a second casing element 21 that, together with the element 15, forms a chamber for inclosing the gear and pinion and retaining lubricant. The joint between the casing elements is preferably that shown in Fig. 3 and includes a flange 22 on the element 21, the latter being grooved circumferentially to receive a strip of packing 23. Overhanging the flange 22 is an exteriorly grooved flange 24 on the element 15, whereby the lubricant splashing up into the casing is caused to drip back into the base or pocket thereof without flowing out through the seam.

While the gearing and casing features thus far described are preferred, it will be understood that they may be replaced by other constructions whereby the same functions are performed, for example, a pair of sprocket gears and a connecting chain may obviously be substituted for the gears.

The engine (not shown) is located forwardly of the cross-bar 3 and its torque is transmitted rearwardly through the shaft 28 (Fig. 1) and other elements, hereinafter described, to a worm wheel 29 (shown dotted in Fig. 5) keyed or otherwise connected to the jack-shaft 19. The worm 30 whereby the worm wheel is driven is preferably located above the latter and is supported at its rear end in a bearing 31 mounted in a boss on the casing 32, access to the bearing being had by means of the plug 33. The splined forward end 34 of the worm shaft is received in and driven by the hub of a clutch gear 35 which is itself mounted in the ball bearing 36 supported by a wall 37 that extends transversely of the casing. A collar 38 retains the clutch gear in the bearing. At its front side the clutch gear 35 is recessed to receive a bearing 40 in which the rear end of a splined shaft section 41 is supported, the forward end of the latter being carried in the bearing 42 in a boss 43 on the front wall of the casing. A collar 44 positions the shaft 41 in respect to the bearing 42 and a gland 45 prevents the escape of lubricant. The shaft 28 is connected to the shaft 41 in any suitable way. Slidable on the shaft 41 is a second clutch gear 46 that has jaws 47 arranged to engage with jaws 48 on the gear 35. A groove 49 on the gear 46 is adapted to receive the end of a suitable lever (not shown) whereby the gear may be shifted longitudinally in either direction from the position shown.

The teeth of the gear 46 are at all times in mesh with the teeth of a reversing gear 50 splined on a shaft 51, the ends of which are mounted in bushings 52—53 (Fig. 5) carried, respectively, by the front wall of the casing and by the wall 37. A suitable lever (not shown) has its end received in the groove 54 at the forward end of the gear 50, whereby the latter may be shifted on the shaft 51. When the reversing gear is at the rearward limit of its movement, it meshes with the teeth 56 on the high speed gear 58 splined on the high speed shaft 59 mounted in bearings 60 and 61 (Fig. 4). The high speed gear also includes teeth 62 (of less pitch diameter than the teeth 56) with which the teeth on the gear 46 engage when the latter is at the limit of its forward movement. It will be understood that the teeth 56 and 62 may be formed on separate gears instead of integral as shown.

The casing 32 is supported at three points, namely through the medium of the bracket 65 which depends from the cross-bar (Fig. 2) and incloses the boss 43, and the brackets 66 which receive the end portions 20 of those parts of the casing that surround the ends of the jack-shaft, and which are secured to the side bars in any preferred manner.

*Operation.*

The direct forward drive takes place on low speed, the torque being transmitted through the shaft 41, gear 46, clutch teeth 47—48, gear 35 and worm 30 to the worm wheel 29, consequently substantially no wear takes place on the gear teeth in the normal operation of the tractor. When it is desired to move forwardly at a higher speed, the gear 46 is shifted forwardly until its teeth mesh with the teeth 62; the torque then passes through the shaft 41, gear 46, gear 58 and gear 35 to the worm 30. If the tractor is to be reversed, the gear 46 is left in the position shown and the gear 50 is thrown rearwardly to the limit of its movement, whereupon the driving force is transmitted through the gear 46, reversing gear 50, teeth 56 and gear 35. Not only is the entire construction compact and subject to a minimum amount of wear; it is also less expensive to manufacture than existing devices. It will be observed that in passing from forward speed on low gear to reverse it is not necessary to pass through high speed, which is of great practical importance.

In the modification shown in Figs. 7, 8 and 9, the worm wheel 29, worm 30 and gear 35 are the same as previously described. The casing 70, which corresponds to the casing 32, is in this instance, however, extended forwardly farther than before, and the shaft 71 is longer than the shaft 41, the construction of the shaft and its bearings being otherwise the same. The high speed shaft 72 corresponds to the shaft 59 but is longer than the latter and has splined thereon gears 73 and 74 which are the equivalent of the one piece gear 58. Upon the forward end of the shaft 72 is keyed an additional gear 75, the teeth of which mesh with the reversing gear 76, the shaft of which is mounted in suitable bearings (not shown) in the end wall of the casing and the boss 78.

*Operation of modification.*—Direct forward drive on low speed takes place as before, namely through the shaft 71 and clutch gears 46 and 35; and for high speed forward, the gear 46 is shifted into mesh with the gear 73, the operation in this respect also being substantially the same as in the preferred form. Should it be desired to reverse, it is merely necessary to further shift the gear 46 forwardly until it meshes with the reversing gear 76, whereupon the propelling force passes through the shaft 71, gear 46, reverse gear 76, gear 75, shaft 72, and gears 74 and 35 to the worm. In this case, however, it is not possible to shift from forward movement on low gear to reverse without passing through forward movement on high gear.

The details may of course be varied to a considerable extent without departing from the spirit of the invention, and the speed ratios may be reversed and yet retain some of the advantages inherent in the construction; for example, the pitch diameters of the gears 46—58 (or 73—74)—35 may be changed in such manner as to cause the direct drive to take place on high speed, in which case the advantages as to compactness would still be secured. Again, the jack-shaft may be divided, in which case a suitable differential (not shown) would of course be interposed between the worm wheel and the jack-shaft sections. I do not, therefore, wish to be limited otherwise than as indicated by the subjoined claims.

I claim:

1. In combination with a transversely extending shaft of a vehicle and a worm wheel for driving said shaft, a worm meshing with said worm wheel and extending longitudinally of the vehicle, a clutch gear secured to one end of the worm, a shaft in alinement with said worm, a second clutch gear slidable on said shaft into and from engagement with the first clutch gear, an idler gear having its axis parallel to the axis of the shaft and being constantly in mesh with the second clutch gear, said idler being slidable longitudinally of its own axis, a third gear meshing with the first mentioned clutch gear, said idler gear meshing with the third gear when in one position, whereby the worm may be driven in either direction.

2. In combination with a transversely extending shaft of a vehicle and a worm wheel for driving said shaft, a worm meshing with said worm wheel and extending longitudinally of the vehicle, a clutch gear secured to one end of the worm, a driving shaft alined with said clutch gear, a slidable clutch gear on the driving shaft, said slidable clutch gear being arranged to engage the other clutch gear to drive the worm from and at the same speed as the driving shaft, a slidable gear having an axis parallel to the axis of the driving shaft, said slidable clutch gear and said slidable gear being constantly in mesh with each other, and means whereby the first mentioned clutch gear may be driven in the opposite direction when the slidable gear is at the limit of its movement in one direction.

3. In combination with a pair of propelling wheels of a vehicle, a jack shaft having an axis substantially parallel with the common axis of the wheels, reduction gearing whereby the wheels are driven from the jack shaft, a worm wheel for driving the jack shaft, a worm for driving the worm wheel, a longitudinally extending driving shaft in alinement with the worm, means for connecting the last mentioned shaft to the worm at will whereby the latter may be driven in the same direction and at the same speed as the former, side bars for the vehicle, a cross bar connecting the side bars, and casing means for the jack shaft, the worm wheel, the worm and the gearing for connecting the driving shaft to the worm, said casing means being supported by the side bars and the cross bar.

4. In combination with a pair of propelling wheels of a vehicle, a jack shaft having an axis substantially parallel with the common axis of the wheels, reduction gearing whereby the wheels are driven from the jack shaft, a worm wheel for driving the jack shaft, a worm for driving the worm wheel, a longitudinally extending driving shaft in alinement with the worm, means for connecting the last mentioned shaft to the worm at will whereby the latter may be driven in the same direction and at the same speed as the former, side bars for the vehicle, a cross bar connecting the side bars, and a single casing means for the jack shaft, the worm wheel, the worm and the gearing for connecting the driving shaft to the worm, said casing having a three-point support on the side bars and the cross bar.

5. In combination with a transversely extending shaft of a vehicle, a second shaft extending longitudinally of the vehicle and means for driving the first shaft from the second shaft, a clutch gear secured to one end of the second shaft, a third shaft in alinement with the second shaft, a second clutch gear slidable on the third shaft into and from engagement with the first clutch gear, an idler gear having its axis parallel to the axis of the third shaft and being constantly in mesh with the second clutch gear, said idler being slidable longitudinally of its own axis, a third gear meshing with the first clutch gear, said idler gear meshing with the third gear when in one position, whereby the worm may be driven in either direction.

6. In combination, a driven shaft, a driving shaft alined therewith, a clutch gear secured to one end of the driven shaft, a slidable clutch gear on the driving shaft, said slidable clutch gear being arranged to engage the other clutch gear at will to drive the driven shaft from and at the same speed as the driving shaft, a slidable gear having its axis parallel to the axis of the driving shaft, said slidable clutch gear and said slidable gear being constantly in mesh with each other, and means whereby the first mentioned clutch gear may be driven in the opposite direction when the slidable gear is at the limit of its movement in one direction.

7. In combination with a pair of propelling wheels of a vehicle, a jack shaft having an axis substantially parallel with the common axis of the wheels, reduction gearing whereby the wheels are driven from the jack shaft, a longitudinally extending shaft for driving the jack shaft, a second longitudinally extending shaft in alinement with the first mentioned longitudinally extending shaft, means for connecting the second longitudinally extending shaft to the first longitudinally extending shaft at will whereby the latter may be driven in the same direction and at the same speed as the former, side bars for the vehicle, a cross bar connecting the side bars, and casing means for the jack shaft, the two longitudinally extending shafts, and the gearing for connecting the two longitudinally extending shafts, said casing being supported by the side bars and the cross bar.

8. In combination with a pair of propelling wheels of a vehicle, a jack shaft having an axis substantially parallel with the common axis of the wheels, reduction gearing whereby the wheels are driven from the jack shaft, a longitudinally extending shaft for driving the jack shaft, a second longitudinally extending shaft in alinement with the first mentioned longitudinally extending shaft, means for connecting the second longitudinally extending shaft to the first longitudinally extending shaft at will whereby the latter may be driven in the same direction and at the same speed as the former, side bars for the vehicle, a cross bar connecting the side bars, and a single casing means for the jack shaft, the two longitudinally extending shafts, and the gearing for connecting the two longitudinally extending shafts, said casing having a three-point support on the side bars and the cross bar.

9. In combination with a pair of propelling wheels of a vehicle, a jack shaft having an axis substantially parallel to the common axis of the wheels, reduction gearing whereby the wheels are driven from the jack shaft, a shaft extending longitudinally of the vehicle, reduction gearing for driving the jack shaft from the last mentioned shaft, side bars for the vehicle, a cross bar connecting the side bars, casing means for the last named reduction gearing and the jack shaft having a three-point support on the side bars and the cross bar.

10. In combination with a pair of propelling wheels of a vehicle, a jack shaft having an axis substantially parallel to the common axis of the wheels, means for driving the wheels from the jack shaft, a shaft extending longitudinally of the vehicle, reduction gearing for driving the jack shaft, a casing for the reduction gearing and the jack shaft, side bars for the vehicle, a cross bar connecting the side bars, the jack shaft extending beyond the side bars, the casing being supported near the ends of the jack shaft on the side bars and having its forward end carried by the cross bar.

11. In combination with an axle and the propelling wheels of a vehicle, a frame including side bars, connections between the side bars and the axle whereby relative vertical movement is prevented, a jack shaft parallel to the axis of the wheels, gears on the wheels, pinions on the jack shaft meshing with the gears, a driving shaft longitudinally of the vehicle centrally between the side bars, a worm wheel for driving the jack shaft, a worm on the longitudinal shaft meshing with the worm wheel, a casing for the jack shaft, the worm wheel and the worm, connections whereby relative vertical movement between the ends of the casing and the side bars is prevented, casings for the gears, the ends of the first mentioned casing being connected to the corresponding one of the last mentioned casings and constituting supporting means therefor.

12. In combination with a transversely extending shaft of a vehicle and a worm wheel for driving the shaft, a worm meshing with the worm wheel and extending longitudinally of the vehicle, a clutch gear secured to the forward end of the worm, a driving shaft alined with said worm and having its end rotatably mounted in the clutch gear, a second clutch gear slidably mounted on the driving shaft, a second shaft parallel to and spaced from the driving shaft, and gear means supported on said second shaft, said gear means including three sets of teeth differing in pitch diameter, the forward set of teeth having the least pitch diameter and the rearward set having the greatest pitch diameter, the forward set being constantly in mesh with the first named clutch gear, an idler gear mounted to turn about an axis parallel to and fixed in reference to the axes of the shafts and being in constant mesh with the forward set of teeth carried by the second shaft, said second clutch gear being arranged to either engage the first clutch gear or the idler gear or the intermediate set of teeth carried by the second shaft at will.

JOHN DEMMLER.